(12) United States Patent
Doble

(10) Patent No.: US 12,736,118 B2
(45) Date of Patent: Sep. 15, 2026

(54) ROTARY ELEMENT FOR TRANSMITTING ROTARY MOTION

(71) Applicant: Richard Doble, Conwy (GB)

(72) Inventor: Richard Doble, Conwy (GB)

(*) Notice: Subject to any disclaimer, the term of this patent is extended or adjusted under 35 U.S.C. 154(b) by 0 days.

(21) Appl. No.: 18/934,407

(22) Filed: Nov. 1, 2024

(65) Prior Publication Data

US 2025/0320914 A1 Oct. 16, 2025

(30) Foreign Application Priority Data

Apr. 16, 2024 (GB) ..................................... 2405386
May 8, 2024 (GB) ..................................... 2406449
Aug. 2, 2024 (GB) ..................................... 2411447
Aug. 27, 2024 (GB) ..................................... 2412550

(51) Int. Cl.
*F16H 48/08* (2006.01)
*F16H 1/08* (2006.01)
*F16H 1/28* (2006.01)
*F16H 55/08* (2006.01)

(52) U.S. Cl.
CPC ......... *F16H 48/08* (2013.01); *F16H 55/0806* (2013.01); *F16H 1/08* (2013.01); *F16H 1/28* (2013.01); *F16H 2055/0866* (2013.01); *F16H 2055/0893* (2013.01)

(58) Field of Classification Search
CPC .......... F16H 13/02; F16H 13/06; F16H 13/14; F16H 1/06–08; F16H 55/08–2055/0893; F16H 1/28; F16H 1/30; F16H 1/34
See application file for complete search history.

(56) References Cited

U.S. PATENT DOCUMENTS 3,406,584 A * 10/1968 Roantree ............. F16H 25/2252 74/424.7
3,481,215 A 12/1969 Howell
7,552,662 B2 * 6/2009 Pardo ........................ F16H 1/08 74/424.5

FOREIGN PATENT DOCUMENTS

CN 104565223 A 2/2015
CN 216131325 U * 3/2022
DE 19640358 A1 * 1/1998 ............. F16H 25/04
DE 19712050 A1 * 9/1998 ............. F16H 55/08

OTHER PUBLICATIONS

Search Report for copending application GB2412550.2 dated Jan. 30, 2025.

* cited by examiner

*Primary Examiner* — James J Taylor, II
(74) *Attorney, Agent, or Firm* — LADAS & PARRY LLP

(57) ABSTRACT

A rotary element for a rotary transmission has a helical radial projection disposed about a rotary axis thereof, the helical radial projection having leading and trailing edges of different diameter. A helical peripheral surface between the leading and trailing edges has a radial profile which is inclined to a tangent to the envelope and preferably has an elliptic profile in a radial plane. In use with another such rotary element having a helical radial projection of opposite handedness in a rotary transmission, a point (P) of rolling contact of the helical peripheral surface with a helical peripheral surface of the other such rotary element helically traverses the helical peripheral surfaces of both rotary elements to positively transmit rotary drive between them without interdigitation of their respective helical radial projections and the associated sliding friction between them as arising in a gear transmission.

18 Claims, 8 Drawing Sheets

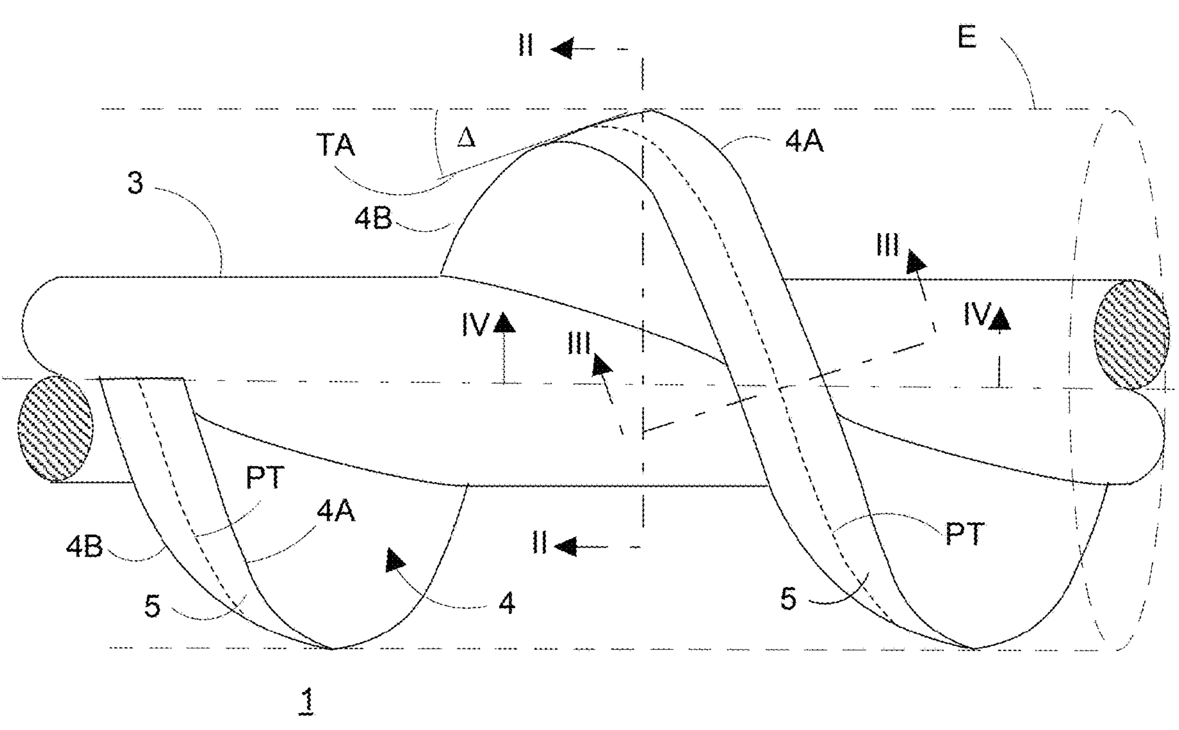
FIG. 1
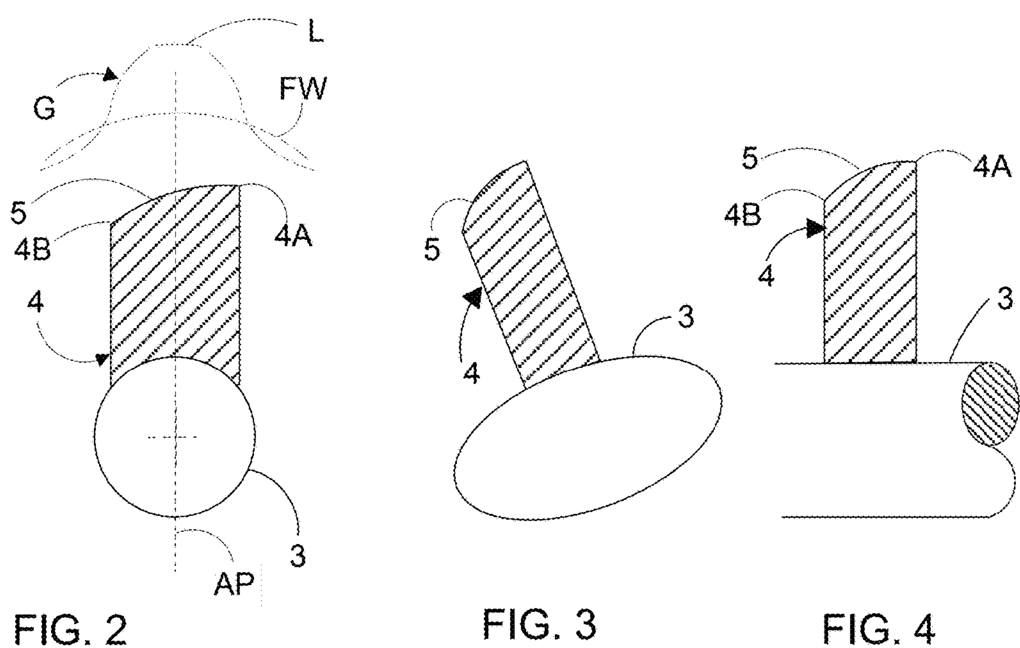
FIG. 2
FIG. 3
FIG. 4

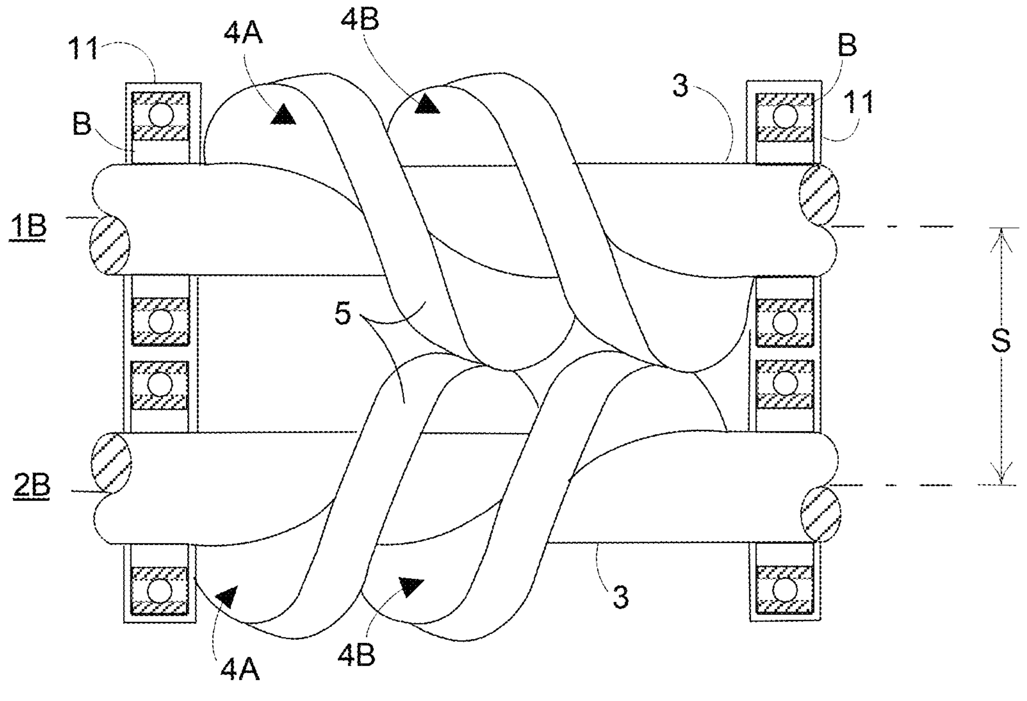
FIG. 11
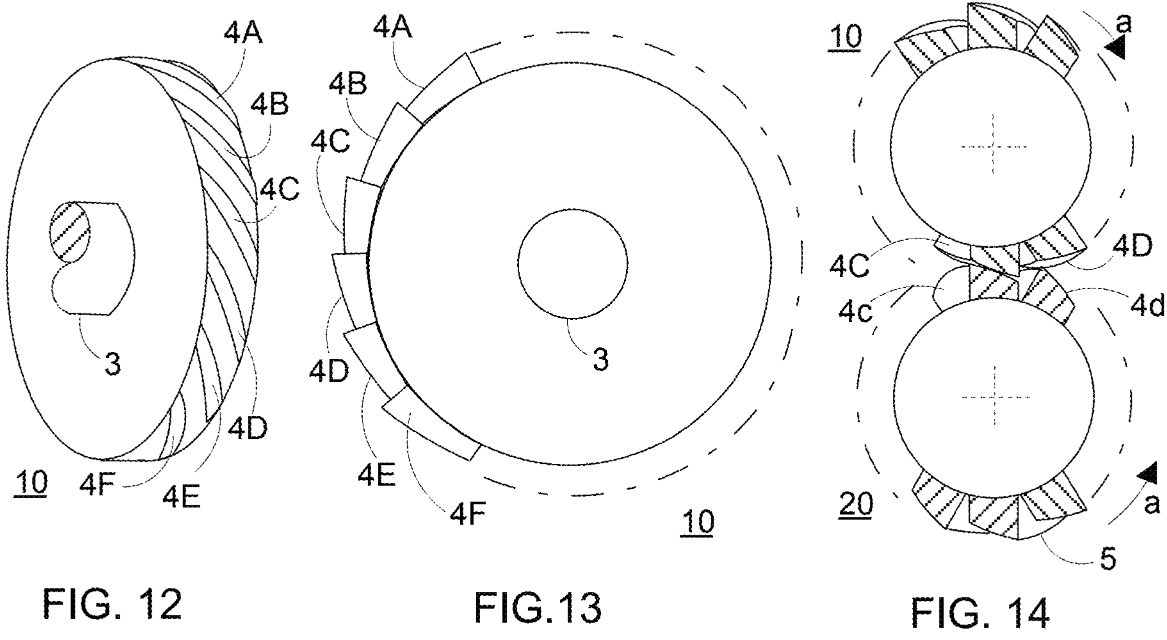
FIG. 12
FIG.13
FIG. 14

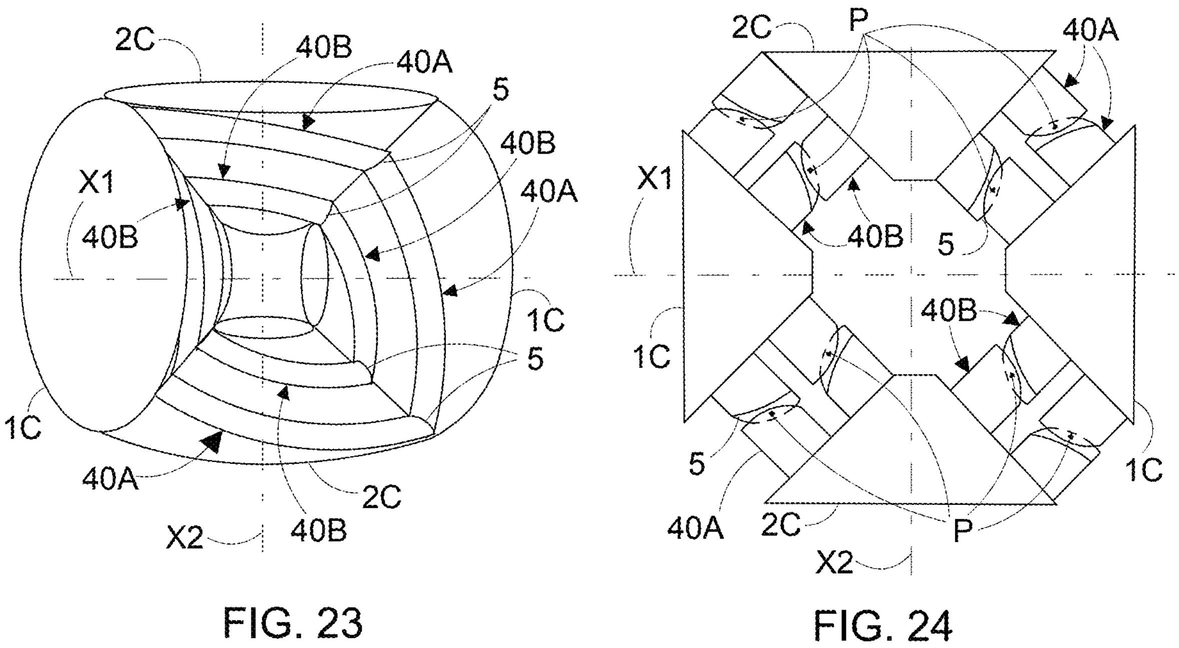
FIG. 23
FIG. 24
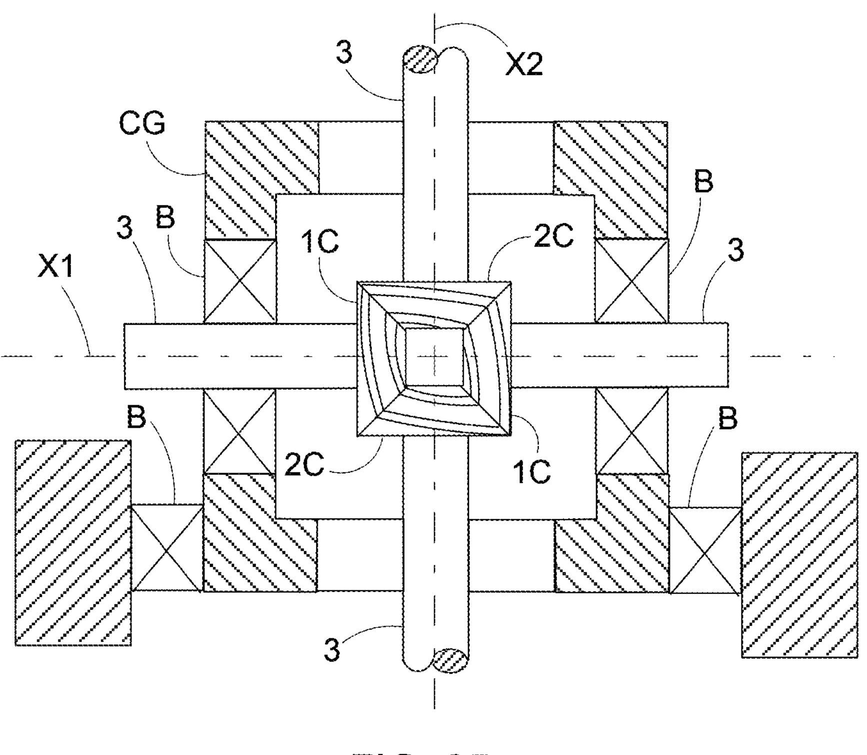
FIG. 25

ROTARY ELEMENT FOR TRANSMITTING ROTARY MOTION

CROSS REFERENCE TO RELATED APPLICATIONS

The present application claims priority from British Patent Application GB 2405386.0, filed on 16 Apr. 2024, British Patent Application GB 2406449.5, filed on 8 May 2024, British Patent Application 2411447.2 filed on 2 Aug. 2024 and British Patent Application GB 2412550.2, filed on 27 Aug. 2024, the contents of all of which are incorporated herein by reference.

FIELD OF THE INVENTION

The present invention relates to a rotary element for positively transmitting transmitting rotary motion in a drive arrangement comprising two such rotary elements and relates also to such a rotary drive arrangement.

BACKGROUND

In a crude friction wheel arrangement, the rim of one friction wheel frictionally engages the rim of another and the drive ratio D is determined by the ratio of their diameters. D may accordingly be any value, including an irrational number. Since the rims are circular, there is no sliding friction between them, unless they slip under load; the corollary is that they lack the mechanical engagement between non-tangential surfaces which would ensure positive drive. Nevertheless, continuously variable transmissions (CVTs) such as toroidal CVTs have employed rollers disposed between and frictionally transferring rotary motion between facing toroidal discs whose surfaces are profiled to allow the drive ratio to be varied by varying the contact regions between each roller and the toroidal discs.

Gears have the opposite combination of advantage and disadvantage, namely sliding friction between the teeth surfaces, but positive drive between the (non-tangential) engaging surfaces of the interdigitating teeth. This is true of both involute and cycloidal gear profiles and both spur gears and helical gears. The drive ratio is determined by the numbers of teeth and this can impose design compromises if the number of teeth is limited, e.g. in calendar complications in horology.

In order to avoid mutual scraping between the gear teeth it is conventional to truncate the tips of the gear teeth to form a top land, i.e. a flat, tangential peripheral surface, which defines the tip circle and is designed to avoid contact with any surface, particularly the dedendum, of the meshing gear teeth. Thus the peripheral surface of a gear tooth is normally designed to be non-engaging with any other surface.

An object of the present invention is to provide a novel rotary element which at least to some degree combines advantages of both friction wheels and gears but which overcomes or alleviates some of their disadvantages.

SUMMARY OF THE INVENTION

The invention provides a rotary element for a rotary transmission, the rotary element having at least one helical radial projection disposed about a rotary axis thereof, the helical radial projection having a helical peripheral surface which defines an envelope of the rotary element, the helical peripheral surface having a profile in a radial plane which is inclined to a tangent to said envelope, whereby in use with another such rotary element of opposite handedness in a rotary transmission, a region of rolling contact of the helical peripheral surface with a helical peripheral surface of the other such rotary element helically traverses the helical peripheral surfaces to positively transmit rotary drive between the rotary elements.

The inclined profile of the helical peripheral engaging surface enables the helical radial projection of one such rotary element to push the helical radial projection of another such rotary element and thus achieve positive drive. This is illustrated in various embodiments in FIGS. 6 and 8, and in FIGS. 9A, 9B, 14 and 16, as discussed in more detail below.

In a preferred embodiment the rotary element has at least first and second helical radial projections disposed coaxially about a rotary axis thereof, the helical radial projections being axially spaced apart and having respective first and second helical peripheral surfaces which define a common envelope of the rotary element, each helical peripheral surface having a profile in a radial plane which is inclined to a tangent to said envelope and the inclinations of the first and second helical peripheral surfaces to the tangent being of opposite sense, whereby in use with another such rotary element in a rotary transmission, the helical peripheral surfaces of the rotary element engage with helical peripheral surfaces of complementary inclination of the other rotary element to positively transmit bidirectional rotary drive between the first and second rotary elements at regions of rolling contact.

The invention also provides a rotary element for a rotary transmission, the rotary element having at least one helical radial projection disposed about a rotary axis thereof, the helical radial projection having a helical peripheral surface, the helical peripheral surface having a profile in a radial plane which is asymmetric, whereby in use with another such rotary element of opposite handedness in a rotary transmission, a region of rolling contact of the helical peripheral surface with a helical peripheral surface of the other such rotary element helically traverses the helical peripheral surfaces to positively transmit rotary drive between the rotary elements without interdigitation of their respective helical radial projections.

Preferably said helical peripheral surface has a convex profile in said radial plane. This feature facilitates rolling motion and reduces sliding friction in use.

Preferably said profile is elliptical. This feature minimizes sliding friction, theoretically to zero in preferred rotary drive arrangements. This is illustrated in FIGS. 6, 9A and 16, as discussed in more detail below.

Preferably the rotary element has a plurality of such helical radial projections forming separate turns or separate partial turns. This feature provides a plurality of contact regions in use, which spreads the load and tends to reduce wear.

Preferably the helical radial projections are regularly spaced apart along the rotary axis.

Preferably the helical radial projections are partial turns extending from one end face of the rotary element to another and are regularly spaced around the circumference of the rotary element in circumferentially overlapping fashion. This feature enables the length of the helical radial projections to be reduced for a given helix pitch and thereby enables the length (thickness) of the radial element to be reduced, which is an important consideration in some applications, eg watchmaking.

In a preferred embodiment the at least one helical radial projection has a transverse cross-section comprising two flank sides on either side of said helical peripheral engaging surface. Unlike the flank sides of a gear tooth, the flank sides of such an embodiment are not required to engage with the flank sides of any other radial element in use, and can optionally be inclined inwardly towards the helical peripheral surface to maximize the strength of the helical radial projection. They can optionally be left unfinished in order to reduce manufacturing costs.

Preferably the helical peripheral surface is selectively treated by hardening or polishing or both to reduce rolling friction. For example, a steel radial projection can have its helical peripheral surface hardened by carburizing.

In low cost applications, the or each rotary element can optionally be formed of plastics material, e.g. polyamide.

In certain embodiments said helical peripheral surface has an envelope which is tapered in the axial direction. In particular, said envelope is optionally frusto-conical.

The invention also provides a rotary drive arrangement comprising first and second mutually engaged rotary elements mounted for rotation about respective rotary axes thereof and having helical radial projections disposed about respective rotary axes of the rotary elements, the helical radial projections being of opposite handedness, the helical radial projection of each rotary element having a helical peripheral surface which defines an envelope of that rotary element, the helical peripheral surface having a profile in a radial plane which is inclined to a tangent to said envelope, wherein in use a region of rolling contact of the respective helical peripheral surfaces helically traverses the helical peripheral surfaces to positively transmit rotary drive between the rotary elements.

In a preferred embodiment the rotary drive arrangement comprises mutually engaged first and second rotary elements mounted for rotation about respective rotary axes thereof, each rotary element having at least first and second helical radial projections disposed coaxially about a rotary axis thereof, the first and second helical radial projections being axially spaced apart and having respective first and second helical peripheral surfaces whose profiles in a radial plane are oppositely inclined with respect to a tangent to a common envelope thereof, wherein the helical peripheral surfaces of the first rotary element engage with helical peripheral surfaces of the second rotary element of complementary inclination to positively transmit bidirectional rotary drive between the first and second rotary elements at regions of rolling contact which regions of rolling contact helically traverse the helical peripheral surfaces.

The invention also provides a rotary drive arrangement comprising first and second rotary elements mounted for rotation about respective rotary axes thereof and having helical radial projections disposed about respective rotary axes of the rotary elements, the rotary elements being of opposite handedness, the helical projections having respective helical peripheral surfaces, each of which surfaces has a profile in a radial plane which is asymmetric, wherein in use a region of rolling contact of the respective helical peripheral surfaces helically traverses the helical peripheral surfaces to positively transmit rotary drive between the rotary elements without interdigitation of their respective helical radial projections.

Preferably the rotary elements are as defined above.

In some embodiments the ratio of the radii from the respective rotary axes of the first and second rotary elements to a point of rolling contact is D such that D>1.0 or D<1.0.

In some embodiments the ratio of the radii from the respective rotary axes of the first and second rotary elements to a point of rolling contact is D such that D is an irrational number.

Preferably the respective helical radial projections have leads inversely proportional to the respective radii from their rotary axes to the centre of the region of rolling contact. This feature ensures that engagement between the helical peripheral projections is maintained throughout multiple revolutions of both rotary elements; in general the faster rotation of the smaller diameter rotary element is compensated by the correspondingly greater lead of the helix defining its helical peripheral radial projection.

Another preferred features include a rotary drive arrangement according wherein the rotary elements are bevel in form and the rotary drive arrangement is selected from the group consisting of a differential and a planetary drive arrangement.

A further preferred embodiment provided an annular rotary element for a rotary transmission comprising at least one internal helical track disposed about a rotary axis thereof, the helical track having a helical surface which defines an internal envelope of the annular rotary element, the helical surface having a profile in a radial plane which is inclined to a tangent to the internal envelope, whereby in use with an internal rotary element having a corresponding external helical radial projection of same sense and a profile in a radial plane of complementary inclination, the helical surfaces of the respective rotary elements engage to positively transmit rotary drive at regions of rolling contact between them.

In a preferred embodiment the respective peripheral surfaces of the helical radial projections have elliptical profiles defined by ellipses centred on the respective rotary axes of the rotary elements which ellipses touch at a point of rolling contact, the ellipses having the same major diameter and same minor diameter and the respective rotary axes being spaced apart by the sum of said major and minor diameters. This feature reduces sliding friction between the helical radial projections, theoretically to zero.

In an embodiment the relative axial positions of the rotary elements are variable so as to vary the drive ratio.

Optionally said helical peripheral engaging surfaces are unlubricated.

In an embodiment the rotary elements are bevel in form and their rotary axes are inclined towards each other in a common plane.

In an embodiment the rotary elements are bevel in form and the rotary drive arrangement is a differential.

BRIEF DESCRIPTION OF THE DRAWINGS

Preferred embodiments of the invention are described below by way of example only with reference to FIGS. 1 to 25 of the accompanying drawings, wherein:

FIG. 1 is a side elevation of a rotary element in accordance with the invention;

FIG. 2 is a diagrammatic cross-section taken on II-II of FIG. 1;

FIG. 3 is a diagrammatic cross-section taken on III-III of FIG. 1;

FIG. 4 is a diagrammatic cross-section taken on IV-IV of FIG. 1;

FIG. 11 is a diagrammatic side elevation of a rotary drive arrangement in accordance with the invention in which each rotary element has two radial projections axially spaced apart by half a turn;

FIG. 12 is a diagrammatic perspective view of a further rotary element in accordance with the invention, having multiple helical radial projections;

FIG. 13 is an end elevation of the rotary element of FIG. 12;

FIG. 14 is a diagrammatic end elevation of a rotary drive arrangement in accordance with the invention showing two rotary elements as shown in FIGS. 12 and 13 positively engaging without interdigitation;

FIG. 23 shows four frusto-conical rotary elements of a differential rotary drive arrangement in accordance with the invention;

FIG. 24 is a diagrammatic sectional view of the arrangement of FIG. 23, taken parallel to and closely adjacent a common plane of the rotary axes of the rotary elements, and FIG. 25 is diagrammatic sectional view of a differential incorporating the rotary elements of FIGS. 23 and 24.

DETAILED DESCRIPTION OF THE INVENTION

Figures 5, 6, 7, 8:
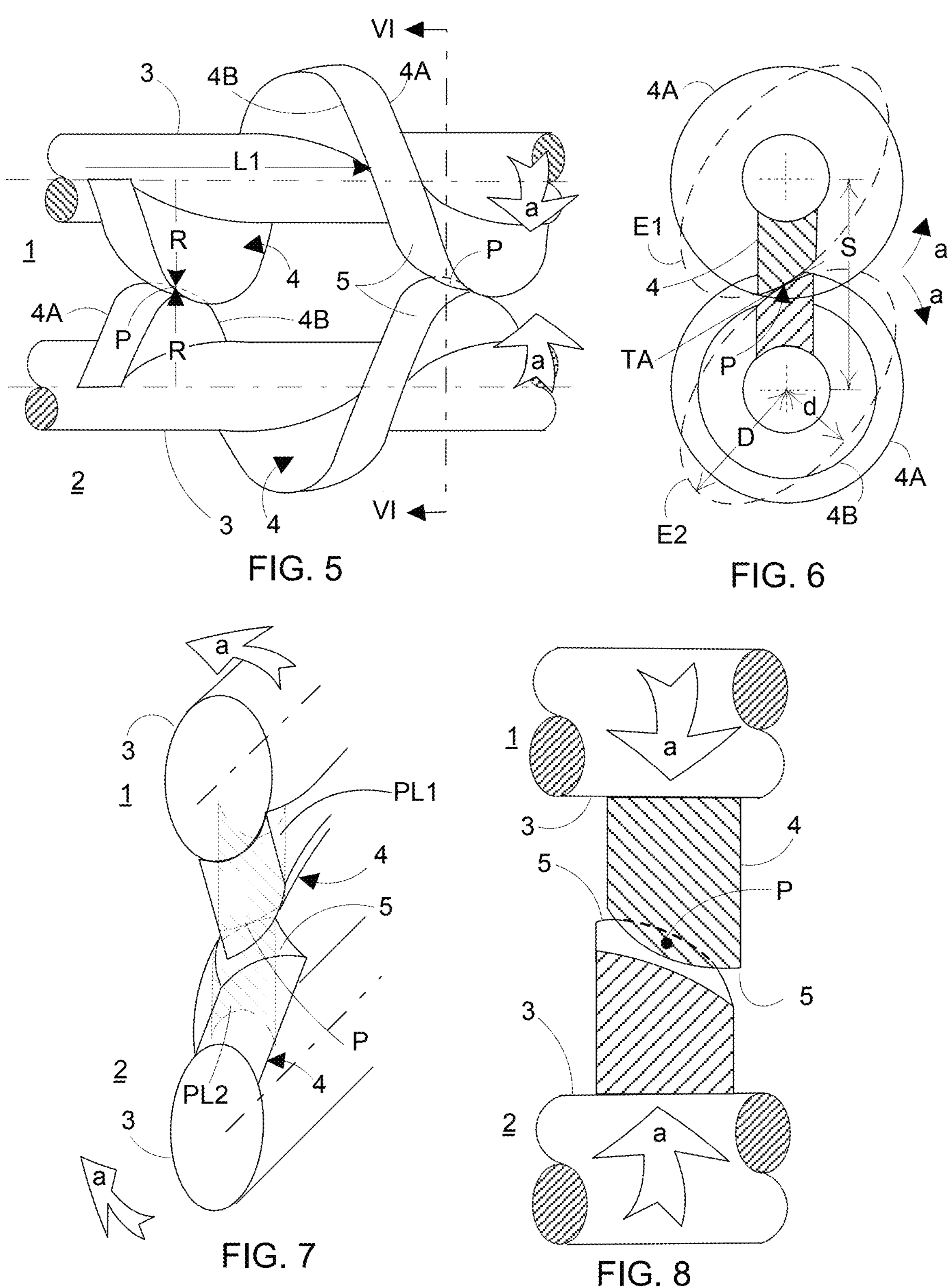
FIG. 5 is a side elevation of a rotary drive arrangement in accordance with the invention, showing continuous rolling engagement of the helical peripheral engaging projections of two rotary elements as shown in FIG. 1.
FIG. 6 is an end elevation taken on VI-VI of FIG. 5.
FIG. 7 is a diagrammatic perspective view showing the engagement of the helical radial projections of the rotary drive arrangement of FIGS. 5 and 6.
FIG. 8 is a diagrammatic cross-section in the common axial plane of FIG. 5 showing the positive driving engagement of one turn of the helical radial projections thereof.

In the following description of FIGS. 1 to 11, the leading edge of a helical projection will be considered to be the right-hand edge (the trailing edge being the left-hand edge)

In the following description generally, what in practice will be a small region of rolling contact will be described as a point of rolling contact because that is consonant with the geometry of the described embodiments when the helical peripheral surfaces 5 are not compressed by a transmitted torque.

Referring to FIG. 1, the rotary element 1 comprises a shaft 3 mounted for rotation about its axis and a parallel-sided helical radial projection 4 secured to the shaft. The helical radial projection 4 forms one and a half turns and its sense is right-handed.

The leading edge 4A of helical radial projection 4 defines a cylindrical envelope E and the trailing edge 4B defines a similar cylindrical envelope (not shown) of lesser diameter which is coaxial with envelope E.

A helical peripheral radial surface 5 formed between leading and trailing edges 4A and 4B is inclined radially inwardly from leading edge 4A towards the trailing edge 4B, as best shown in FIG. 4.

As shown in FIG. 3, the lateral cross-section through the helical radial projection 4 exhibits a convex profile of the helical peripheral radial surface 5. Consequently, as shown in FIG. 2, helical peripheral radial surface 5 is convex in the radial plane, and as shown in FIG. 4, in the axial plane also. Thus helical peripheral surface 5 is biconvex. As will be explained below, helical peripheral surface 5 is capable of engaging a helical peripheral surface 5 of a similar rotary element at, nominally, a contact point whose locus PT runs along the helical peripheral surface is shown in FIG. 1.

It should be noted that locus PT is a helix and lies midway between the leading and trailing edges 4A and 4B of the helical peripheral radial surface 5 over the entirety of the length of locus PT. Only rolling friction occurs between two mutually engaging rotary elements, as will become apparent from the description of FIGS. 5 and 6 below.

Conversely, in a conventional meshing gear arrangement, the locus of the contact point or contact region moves across the leading edge of a flank surface of a gear tooth of one gear as that tooth ends its engagement with a meshing tooth of the other gear. This results in sliding friction.

The angle of inclination Δ between the cylindrical surface of envelope E and tangent TA at the mid-point (namely its intersection with locus PT) of helical peripheral radial surface 5 is preferably in the range 5° to 45°, more preferably in the range 10° to 30°.

Referring to FIG. 2, the profile of helical peripheral surface 5 is inclined in the radial plane, i.e. the plane of FIG. 2, relative to its tangent to the envelope of the rotary element 1; for example the centre of the profile of helical peripheral surface 5 which cuts axial plane AX is inclined to tangent T to the envelope E. This inclination enables positive drive between two rotary drive elements, as will become further apparent from the description of FIG. 6, and contrasts with the symmetrical arcuate profile FW (shown in phantom in the Figure) of a friction wheel, which cannot positively transmit drive. It also contrasts with the symmetric profile G of a gear tooth, also shown in phantom in FIG. 2. Additionally it will be noted that the peripheral surface of a gear tooth is normally a land L as shown, which is specifically designed not to engage any part of the teeth on a meshing gear (not shown) and thus has the opposite function of helical peripheral surface 5 in embodiments of the present invention.

In preferred embodiments the contact region (nominally a point in the absence of any distortion of surface 5 under load) lies on the axial plane AX in which the axes of both rotary elements lie. This feature is discussed in more detail below in connection with FIGS. 9A and 9B.

As shown in FIG. 6, the preferred profile of peripheral radial surface 5 in the radial plane is convex, e.g. elliptical. This feature is considered to minimize sliding friction, ideally to zero, but in less preferred embodiments this profile need not be elliptical and in still less preferred embodiments need not be convex. Departures from an elliptical profile geometry shown in FIGS. 6 and 9A will still achieve positive drive but may result in a degree of sliding friction along the helical radial projections 4.

As noted above and as will become apparent from the description of FIG. 6, positive drive between the rotary elements is achieved as a result of the inclination of the profile of helical peripheral surface 5 in the radial plane.

The engagement between rotary element 1 and a similar rotary element 2 is shown in FIGS. 5 and 6. Rotary element 2 is left-handed and is thus of opposite sense to rotary element 1. It will be seen that the respective helical radial projections 4 of the rotary elements 1 and 2 engage at a point P which defines equal radii R of the rotary elements.

Rotary element 1 rotates anticlockwise to drive rotary element 2 clockwise, as indicated by arrows a. The common tangent TA (FIG. 6) to helical peripheral surfaces 5 at P is inclined to the (vertical) normal to the common (horizontal) plane of the axes of the rotary elements 1 and 2, i.e. it is inclined to the plane of the drawing in FIG. 5. This inclination of the helical peripheral drive surface 5 in the radial plane ensures positive drive between the rotary elements 1 and 2 in the directions of rotation a shown in FIGS. 5 and 6.

Preferably the angle Ø between the tangent T to the envelope of rotary element 1 (i.e. the tangent to edge 4A at the intersection of T with the line of the centres c of the shafts 3) and the common tangent TA to the surfaces 5 at their contact point P) is in the range 5° to 45°, more preferably in the range 10° to 30°

As shown in this arrangement, rotary element 1 is the driving element and rotary element 2 is the driven element.

It will be noted that the driving engagement between the helical radial projections 4 occurs without interdigitation of the helical projections 4, unlike in gear drives.

The ellipses E1 and E2 shown in FIG. 6 each have a major diameter D and a minor diameter d, the separation S (S=2R) between their centres being ½ (D+d) such that they touch at a point P lying in their common axial plane (corresponding to plane AX in FIG. 2) and on common tangent TA. Accordingly it will be appreciated that if the rotary element 1 had a cross-section of the complete ellipse E1 and element 2 similarly had a cross-section of the complete ellipse E2 as shown, then rotation of ellipse E1 anticlockwise would rotate ellipse E2 at an increasing drive ratio until the major diameter of ellipse E1 becomes vertical and the major diameter of ellipse E2 becomes horizontal. At this point, their common tangent TA would become horizontal and the ellipse E1 would slide over ellipse E2. i.e. positive drive would be lost.

However, in the rotary drive arrangement shown in FIG. 6, peripheral engaging surface 5 of rotary element 1 has a profile corresponding to ellipse E1 in the radial plane of FIG. 6 and peripheral engaging surface 5 of rotary element 2 has a profile corresponding to ellipse E2 in that radial plane and both peripheral engaging surfaces are helical. Accordingly, as the rotary element 1 rotates anticlockwise as indicated by arrow a, it drives rotary element 2 clockwise and the turns of the respective helical projections 4 of the two rotary elements move in the fashion of the stripes on a barber's pole to maintain their engagement—in other words the situation shown in FIG. 6 is maintained but the plane of FIG. 6 and associated point of contact P move axially left (in FIG. 5). When a pair of engaging turns reaches the left end of the rotary elements 1 and 2 and they disengage, drive is maintained by a succeeding pair of engaging turns and then a further pair of turns at the right end make contact and a continuous cycle is maintained with a constant drive ratio (in this case 1:1). The locus PT (FIG. 1) of point of contact P remains midway between the leading and trailing edges 4A and 4B and there is no sliding friction between the rotary elements.

This axial movement of the point of contact P is illustrated in FIG. 7, which is an oblique diagrammatic view of the engaging turns of the helical radial projections 4 shown in FIG. 6. In the configuration shown in FIG. 7, the helical peripheral surfaces 5 of the respective upper and lower rotary elements 1 and 2 engage in a coincident radial plane corresponding to sections PL1 and PL2. This radial plane is the plane of FIG. 6. As upper rotary element 1 rotates anticlockwise as indicated by the upper a, its helical radial projection 4 drives the helical radial projection 4 of the lower rotary element 2 clockwise as indicated by the lower a. Consequently, sections PL1 and PL2 and their associated contact point P move rearwardly as viewed in FIG. 7 or axially to the left as viewed in FIG. 5.

FIG. 8 shows the location of the contact point P (indicated as a black dot for clarity) in more detail, shown lying marginally behind the section plane through the upper helical radial projection 4 and on the intersection between the upper and lower helical peripheral engaging surfaces 5 although it is preferred that point P lies in the common plane of the axes of shafts 3, i.e. the common plane of the rotary axes of the rotary elements 1 and 2. Accordingly, rotation of upper rotary element 1 as indicated by upper a will result in upper peripheral engaging surface 5 pushing lower peripheral engaging surface 5 at point P in the opposite direction of rotation indicated by lower arrow a. Thus, positive drive is achieved.

It will be appreciated that in practice when an appreciable torque is being transmitted, there will be some compression of the helical peripheral engaging surfaces 5 and what is nominally a point P will in practice be a region of contact.

Figure 9:
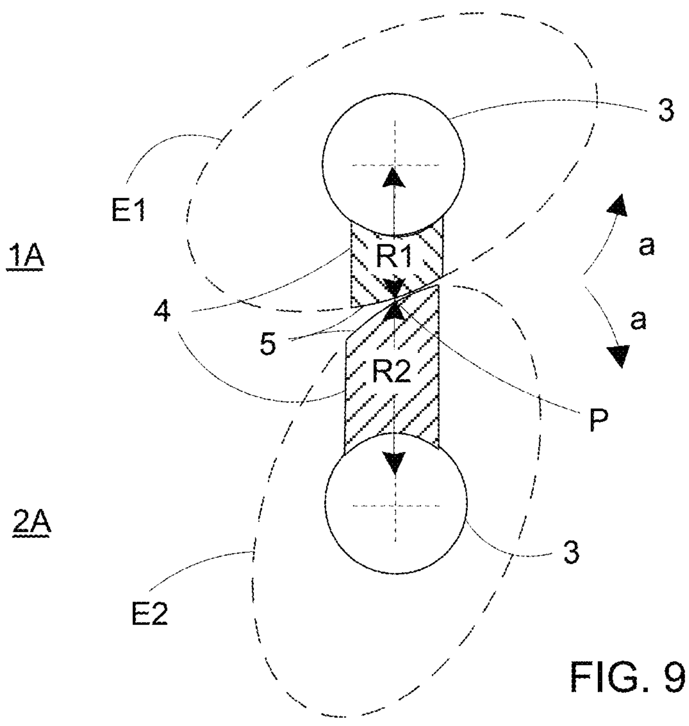
FIG. 9 is a diagrammatic cross-section in the axial direction showing a variant of the rotary drive arrangement shown in FIG. 6 in which the rotary elements have unequal radii.

FIG. 9 shows a variant of the rotary drive arrangement shown in FIG. 6 in which rotary elements 1A and 2A are based on the same ellipses E1 and E2 as shown in FIG. 6, with the same spacing between the shafts 3 on which the ellipses are centred, but with a further rotation of the ellipses to a configuration in which their point of contact P is located a position corresponding to unequal radii R1 and R2 of the respective ellipses E1 and E2. Thus upper rotary element 1A is of smaller diameter than lower rotary element 2A. Point of contact P lies in the common plane of the rotary axes of rotary elements 1A and 2A.

The helical radial projections 4 of the respective rotary elements 1A and 2A have peripheral engaging surfaces 5 whose profiles correspond to the respective ellipses E1 and E2. The ratio R1/R2=D where D is optionally an irrational number. In general, D is determined by the configuration of the ellipses E1 and E2 and can vary between d/D and D/d where D and d are the major and minor diameters of the ellipses (see FIG. 6). In certain embodiments, D>1.0 or D<1.0.

It should be noted that the drive ratio can be varied continuously by varying the relative axial positions of the rotary elements, which (assuming their mutual engagement is maintained) effectively varies the angular configuration of the ellipses E1 and E2 (compare FIGS. 6 and 9) and hence the position of the contact point P, which remains in the common axial plane of the rotary elements but moves closer to the axis of one rotary element and away from the other as the ellipses E1 and E2 are moved to an angular configuration different from that shown in FIG. 6 to e.g. that shown in FIG. 9.

In a less preferred variant, not shown, the helical radial projection of the upper rotary element can have a peripheral surface whose profile in the radial plane is flat, i.e. a straight line, rather than convex, but aligned with the corresponding portion of ellipse E1. Similarly the helical radial projection of the lower rotary element can have a peripheral surface which is flat, i.e. a straight line, rather than convex, but aligned with the corresponding portion of ellipse E2.

Ellipse E1 in this variant has its centre coincident with the axis of the upper rotary element i.e. upper shaft 3 and ellipse E2 has its centre coincident with the axis of the lower rotary element i.e. lower shaft 3.

Thus, convexity in the radial plane of the peripheral surface 5 is not essential. However the embodiment of FIG. 9 is preferred over that of the above variant because the load at contact point P is better distributed.

Figure 10:
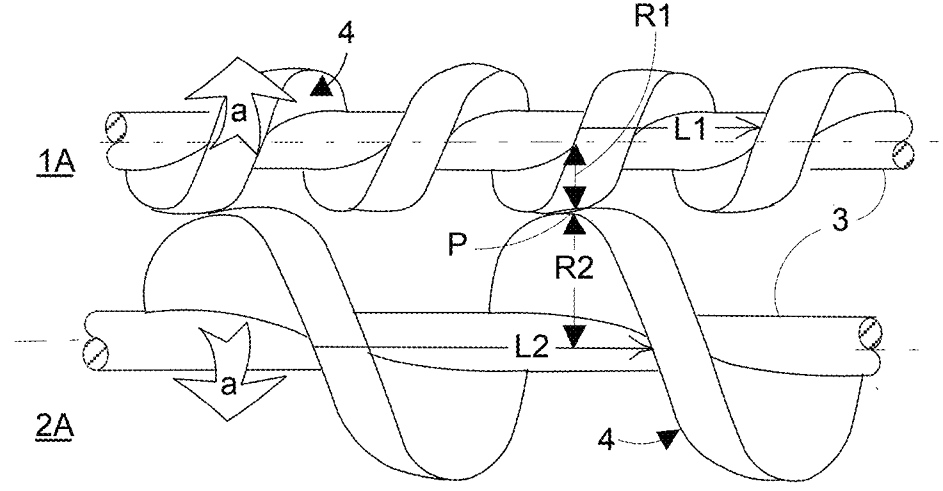
FIG. 10 is a diagrammatic side elevation of the variant shown in FIG. 9.

Referring to FIG. 10, a drive arrangement utilizing rotary elements 1A and 2A is shown in more detail. Because each rotation of rotary element 1A will rotate rotary element 2A by R1/R2 turns, the lead L2 of rotary element 2A is R2/R1×L1, the lead of rotary element 1A, in order to keep the turns in engagement contact point P, as shown. Thus rotation of rotary element 1A anticlockwise (FIG. 9) will rotate rotary element 2A clockwise (FIG. 9) as indicated by arrows a in FIGS. 9 and 10. This rotation will move contact point P (FIG. 10) axially to the left in FIG. 10.

It will be noted that the larger diameter rotary element 2A has more than one turn in order to enable contact throughout multiple revolutions of rotary element 2A. This has implications for the axial length of the rotary element for a given helix pitch angle of its helical radial projection 4.

One way of reducing the required axial length of a rotary element is to include more than one helical radial projection 4. Such an embodiment is shown in FIG. 11, which shows rotary elements 1B and 2B mounted for rotation about their rotary axes on bearings B, the bearings B being mounted on a frame 11 which maintains the spacing between the axes at spacing S (FIG. 6).

Each rotary element 1B and 2B has two helical radial projections 4A and 4B with helical peripheral surfaces 5 having diameters and elliptical profiles as shown in FIG. 6. The rotary elements 1B and 2B are oppositely handed and their helical radial projections 4 are separated in the axial direction by half a turn. Their helical peripheral surfaces 5 are however of complementary inclination in the radial plane (as in FIGS. 5 and 6) engage at two contact points similarly separated by half a turn.

FIGS. 12 and 13 show a further embodiment of a rotary drive element 10 in which there are multiple helical radial projections 4A, 4B, 4C, 4D, 4E, 4F, . . . which are regularly circumferentially distributed and have a common pitch such that there is overlap in the circumferential direction between the termination of each helical radial projection and the start of the immediately adjacent succeeding radial projection, as shown. Each helical radial projection has a peripheral surface having an asymmetric elliptical profile in the radial plane, with the engaging peripheral surfaces of complementary inclination similar to that shown for peripheral surfaces 5 in e.g. FIG. 6.

Accordingly a rotary drive arrangement as shown in FIG. 14 comprises an upper rotary element 10 as shown in FIGS. 12 and 13 and a lower rotary element 20 which is of opposite handedness to the upper rotary element. Rotation of the upper rotary element 10 in the clockwise direction indicated by upper a drives the lower rotary element 20 anticlockwise as indicated by lower a. The helical peripheral radial surfaces 5 are of complementary inclination in the radial plane and engage with rolling contact in the same manner as indicated in FIGS. 5 and 6, whereby drive is transferred positively without interdigitation of the helical projections. In particular, the helical projection 4C of upper rotary element 10 is shown aligned with a corresponding helical projection 4*c* of lower rotary element 20 and the helical projection 4D with the corresponding helical projection 4*d*.

FIGS. 15 to 18 show a bidirectional rotary drive arrangement according to the invention.

Figures 15, 16, 17, 18:
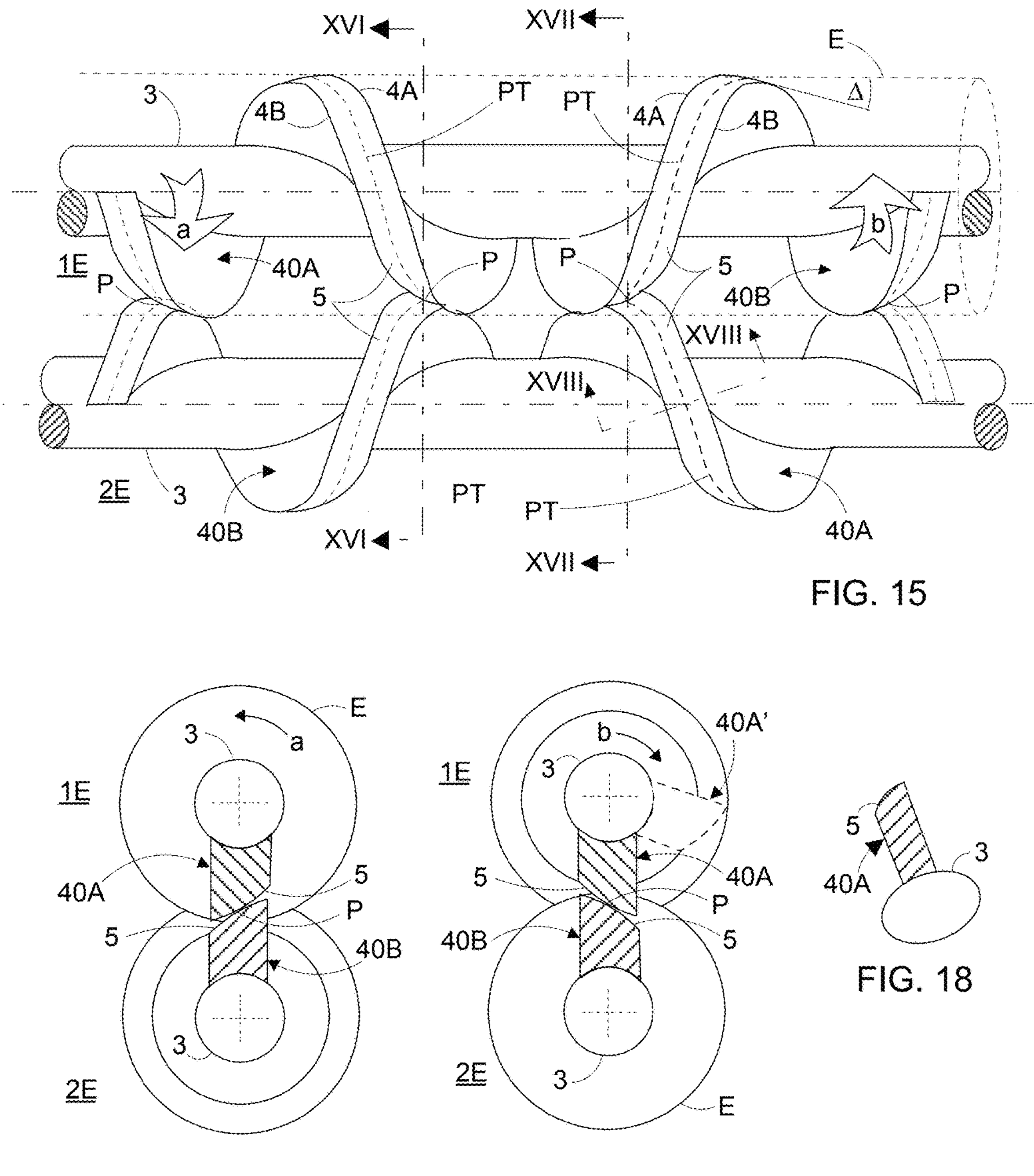
FIG. 15 is a side elevation of a bidirectional rotary element arrangement in accordance with the invention.
FIG. 16 is a diagrammatic cross-section taken on XVI-XVI of FIG. 15.
FIG. 17 is a diagrammatic cross-section taken on XVII-XVII of FIG. 15.
FIG. 18 is a diagrammatic cross-section taken on XVIII-XVIII of FIG. 15

Referring to FIG. 15, a rotary element 1E comprises a shaft 3 mounted for rotation about its axis and two axially spaced-apart oppositely-handed helical radial projections 40A and 40B secured to the shaft.

The helical radial projections 40A and 40B are each parallel-sided.

The helical radial projections in this embodiment 40A and 40B each form one and a half turns, helical radial projection 40A being right-handed and helical radial projection 40B being left-handed.

Each helical radial projection 40A and 40B has a helical peripheral radial surface 5 formed between its leading and trailing edges 4A and 4B, each helical peripheral radial surface 5 being inclined radially inwardly from leading edge 4A towards the trailing edge 4B, as best shown in FIGS. 16 and 17.

Referring to FIG. 15, the angle of inclination Δ of the tangent to the mid-point of peripheral radial surface 5 relative to the surface of envelope E is preferably in the range 5° to 45°, more preferably in the range 10° to 30°.

Each helical peripheral radial surface 5 is convex in the axial plane as shown in FIG. 18.

In this embodiment, envelope E of rotary element 1E corresponds to the envelope of the leading edges 4A but in other embodiments (not shown) in which the radial inclination of the helical peripheral surfaces is lower and/or the convexity of the helical peripheral surfaces 5 is more pronounced it could correspond to a radial extremity of the helical peripheral surfaces intermediate leading and trailing edges 4A and 4B.

In the rotary drive arrangement shown in FIG. 15, rotary element 2E is identical to rotary element 1E but reversed in the axial direction whereby each of its helical peripheral surfaces 5 engages a complementary helical peripheral surface 5 of rotary element 1E. Thus the helical peripheral surfaces 5 of the first rotary element 1E engage with helical peripheral surfaces 5 of the second rotary element 2E of complementary inclination in the radial plane.

This is best seen in FIGS. 16 and 17, which show oppositely inclined helical peripheral surfaces 5 engaging at contact points P which lie in the common plane of the axes of shafts 3, which are parallel as shown.

Accordingly, referring to FIG. 16, anticlockwise rotation (indicated by arrow a) of upper rotary element 1E will cause its helical projection 40A to drive helical projection 40B and hence lower rotary element 2E clockwise. Similarly, referring to FIG. 17, clockwise rotation (indicated by arrow b) of upper rotary element 1E will cause its helical projection 40B to drive helical projection 40A and hence lower rotary element 2E anticlockwise. Thus upper rotary element 1E can be used to drive lower rotary element 2E bidirectionally, or vice versa, with no rotational play, unlike the situation with conventional gearing.

However if a degree of lost motion between the upper and lower rotary elements 1E and 2E is required, one or both of helical projections 40A and 40B may be angularly offset, e.g. as indicated by angularly offset helical projection 40A' in FIG. 17. In that variant, clockwise rotation of upper rotary element 1E as indicated by arrow b will disengage helical projections 40A and 40B of FIG. 16 (thus having no effect on lower rotary element 2E) and engage helical projections 40A' and 40B of FIG. 17 only when projection 40A' reaches the 6 o'clock position.

Referring now to FIG. 15, the loci PT of the contact points P during rotary drive run along the helical peripheral surfaces 5. It should be noted that loci PT are helices and are confined between (and, as shown, preferably lie midway between) the leading and trailing edges 4A and 4B of the helical peripheral radial surface 5 over the entirety of the length of loci PT. Rolling rather than sliding friction occurs between two mutually engaging rotary elements 1E and 2E.

Conversely, in a conventional meshing gear arrangement, the locus of the contact point or contact region moves across the leading edge of a flank surface of a gear tooth of one gear as that tooth ends its engagement with a meshing tooth of the other gear. This interdigitation results in appreciable sliding friction.

Figure 19:
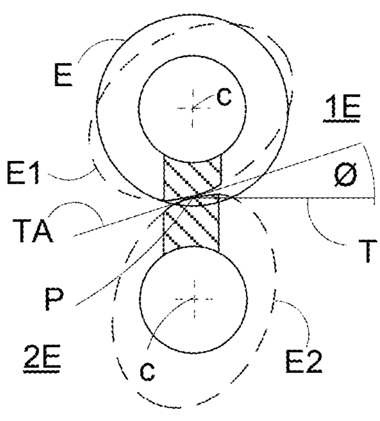
FIG. 19 is a diagrammatic cross-section similar to FIG. 6 showing the geometry of the peripheral surfaces 5 of the helical radial projections in FIG. 15 and other preferred embodiments.

Referring now to FIG. 19, the tangent T to the envelope E (closely adjacent contact point P) of upper rotary element 1E and the common tangent TA to the helical peripheral surfaces 5 of the helical projections subtend an angle Ø in the radial plane. Ø is preferably in the range 5° to 45°, more preferably in the range 10° to 30°. If Ø is too small, there is a risk of one or other of the helical radial projections distorting and slipping over the other under load, whereas if Ø is too large, undue friction may occur between the helical peripheral surfaces as a result of relative rotation of the peripheral surfaces about contact point P in the plane of TA.

In the embodiment of FIGS. 15 to 19, the inclinations of the tangents (TA in FIG. 19) of the helical peripheral surfaces 5 relative to the tangent T to the envelope are equal and opposite. However in a variant, the inclinations may be opposite but unequal.

As shown in FIG. 19, the helical peripheral surfaces of the upper and lower rotary elements 1E and 2E are preferably elliptical, i.e. defined by identical ellipses E1 and E2 respectively. The spacing between centres c of the rotary axes of the upper and rotary elements is equal to half the sum of the major and minor diameters of ellipses E1 and E2, which corresponds to a contact point P located on the line joining centres c. This location of the contact point P is optimal for reducing friction.

It will be noted that the inclination of the common tangent TA relative to envelope tangent T can be varied by varying the eccentricity of the ellipses E1 and E2, ie the ratio of their major and minor diameters. However, an elliptical profile of helical peripheral surfaces 5 is not essential.

Optionally, in view of the virtual absence of sliding friction, the helical peripheral surfaces 5 may be unlubricated.

Figure 20:
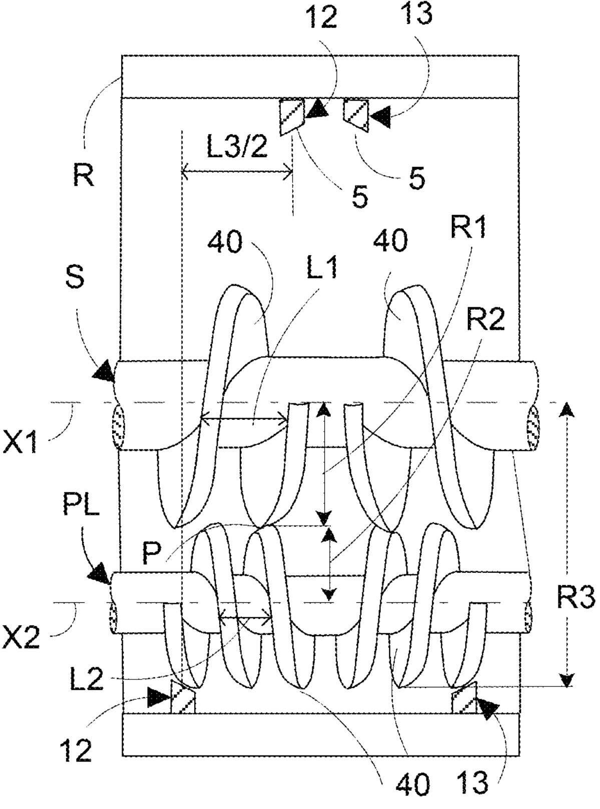
FIG. 20 is a diagrammatic side elevation showing the engagement of sun, planet and ring (annular) rotary elements in planetary drive arrangement accordance with the invention.

FIG. 20 shows, in diagrammatic cross-section, a planetary drive arrangement comprising an annular rotary element R in accordance with the invention mounted for rotation about an axis X1 and having a first internal helical track in the form of a helical radial projection 12 and a second internal helical track in the form of a helical radial projection 13. Each helical radial projection 12 and 13 forms a complete turn with a lead L3 (the dimension L3/2 being shown) and each has an internal peripheral surface 5 which is inclined in the axial plane of the drawing, the inclinations being opposite.

Figure 21:
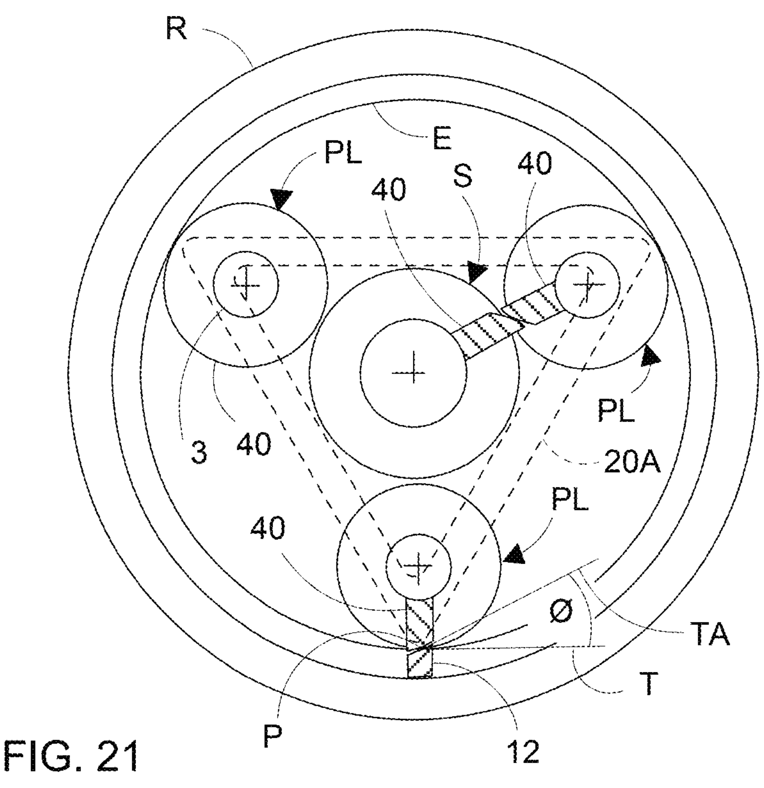
FIG. 21 is a diagrammatic radial cross-section of a planetary drive arrangement in accordance with the invention, taken on XXI-XXI of FIG. 22.

The internal peripheral surfaces 5 define a common internal envelope of the annular rotary element R, each helical surface having a profile in a radial plane which is inclined to a tangent to the common envelope as best seen in FIG. 21. FIG. 21 shows tangent T to the internal envelope of annular rotary element R, inclination line TA which is a continuation of peripheral surface 5 of rotary element R in the radial plane and is tangential to the peripheral surface 5 of projection 40 of a planetary rotary element PL, and angle Ø between T and TA. Ø is preferably in the range 5° to 45°, more preferably in the range 10° to 30°. If Ø is too small, there is a risk in high torque applications of one or other of the helical radial projections distorting and slipping over the other under load, whereas if Ø is too large, undue friction may occur between the helical peripheral surfaces.

The profile of each surface 5 in the axial plane is flat, as shown in FIG. 21.

The senses of the helices of the internal radial projections 12 and 13 are opposite and they are axially spaced apart.

Planetary rotary element PL is mounted for rotation about an axis X2 (which is constrained to be parallel to axis X1 with a fixed spacing R1+R2 between the axes X1 and X2) and has two helical radial projections 40 which are axially spaced apart and whose helices are of opposite sense so as to engage in rolling fashion the helical radial projections 12 and 13 respectively. The peripheral surfaces of the helical radial projections 40 of planetary rotary element PL have complementary inclinations in the axial plane (cf angle Δ in FIG. 15) and the radial plane (angle Ø in FIG. 19) to the respective engaging helical surfaces 5 of projections 12 and 13, and their profiles are similar to that shown in FIG. 5. Thus the planetary rotary element PL is similar to e.g. rotary element 1E of FIG. 15, but has more turns and the lead L2 is smaller.

Referring to FIG. 21, Ø is preferably in the range 5° to 45°, more preferably in the range 10° to 30°.

Referring to FIG. 20, the ratio R2/R3 of the radii R2 and R3 of planetary rotary element PL and annular rotary element R is equal to the ratio L2/L3 of the leads of their helical radial projections 40 and 12/13. (The radii are measured from the axis of rotation to the contact point P of the helical peripheral surfaces.)

Accordingly, planetary rotary element PL can roll without slippage around the interior of annular rotary element R with the peripheral helical surfaces of its helical radial projections 40 in continuous rolling contact with the internal peripheral surfaces 5 of helical radial projections 12 and 13.

The ratio R1/R2 and/or R2/R3 may optionally have an irrational value.

As shown in FIG. 20, a sun rotary element S is mounted for rotation about axis X1 of the annular rotary element R and has helical radial projections 40 which are axially spaced apart and whose helices are of opposite sense so as to engage in rolling fashion the respective helical radial projections 40 of planetary rotary element PL. The peripheral surfaces of the helical radial projections 40 of sun rotary element PL have complementary inclinations in the axial plane (cf angle Δ in FIG. 15) and the radial plane (cf angle Ø in FIG. 21) to the respective engaging helical peripheral surfaces of helical radial projections 40 of the planetary rotary element PL, and their profiles are similar to that shown in FIG. 19. Thus the sun rotary element S is similar to e.g. rotary element 1E of FIG. 15, but has a larger radius R1 and the lead L1 is smaller.

The ratio R1/R2 of the radii R1 and R2 of sun planetary rotary element S and planetary rotary element PL is equal to the ratio L1/L2 of the leads of their respective helical radial projections 40. (The radii are measured from the axis of rotation to the contact point P of the helical peripheral surfaces, as shown in FIG. 20.)

Accordingly, since the axis X2 of planetary rotary element PL is maintained at a distance of R1+R2 from common axis X1 of the sun and annular rotary elements, it can roll without slippage around sun rotary element S with the peripheral helical surfaces of its helical radial projections 40 in continuous rolling contact with those of the helical radial projections 40 of the sun rotary element S.

Bidirectional positive drive can thus be achieved between sun rotary element S, planetary rotary element PL and annular rotary element R in the arrangement of FIG. 20.

During the rotation of the rotary elements of FIG. 20, the contact points P of the tracks 12 and 13, the peripheral helical surfaces of the helical projections 40 of planetary rotary element PL and the peripheral helical surfaces of the helical projections 40 of sun rotary element S remain in the common plane of axes X1 and X2. This minimizes friction and nearly eliminates sliding friction.

During this rotation, the contact points P follow continuous helical tracks similar to tracks PT shown in FIG. 15.

Preferably, there are a plurality, e.g. three or four planetary rotary elements PL rather than one as shown, for clarity and ease of illustration, in FIG. 20.

Figure 22:
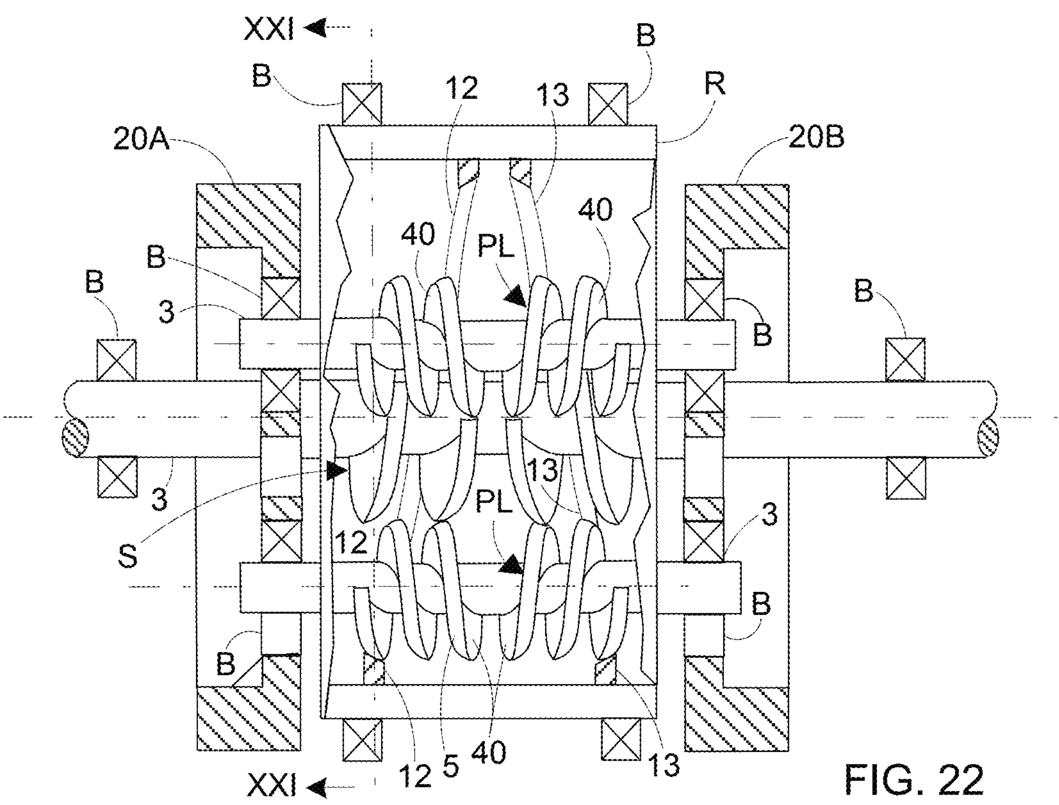
FIG. 22 is a diagrammatic side elevation, partly broken away and partly in axial cross-section, of the planetary drive arrangement of FIG. 21.

FIGS. 21 and 22 show an embodiment comprising the sun rotary element S of FIG. 20, three planetary rotary elements PL like that of FIG. 20, and the annular rotary element R of FIG. 20.

Referring to FIGS. 21 and 22, three planetary rotary elements PL having shafts 3 mounted on bearings B are held in a regular circumferential array within a carrier 20A, 20B so as to engage sun rotary element S and annular rotary element R in the manner shown in FIG. 20.

Referring to FIG. 22, carrier 20A, 20B is fixed, i.e. it cannot rotate.

FIG. 21 shows the engagement of helical radial projections 40 of the sun and planetary rotary elements of the top right planetary rotary element PL. It will be apparent that anticlockwise rotation of this planetary element will drive sun rotary element S clockwise. In this regard, FIG. 21 is analogous to FIG. 16. A similar cross-section to FIG. 21 through projection 13 at the lower right hand side of FIG. 22 would show a configuration similar to FIG. 17, i.e. the reverse of the situation shown in FIG. 21 whereby clockwise rotation of the top right planetary element PL of FIG. 21 will drive sun rotary element anticlockwise. In this manner, this planetary rotary element PL (and likewise the other two planetary rotary elements) is bidirectionally coupled to sun rotary element S by the two axially spaced sets of oppositely inclined engaging surfaces of helical projections 40.

FIG. 21 also shows the engagement of the helical radial projection 40 of the lower planetary radial element PL with the helical radial projection 12 of annular rotary element R. This is similar to the configuration shown in FIGS. 16 and 19, except that the inwardly-facing helical surface of projection 12 is flat in radial profile rather than elliptical. Anticlockwise rotation of lower planetary element PL will drive annular rotary element R clockwise. A similar cross-section to FIG. 21 through projection 13 at the lower right hand side of FIG. 22 would show the reverse of the situation shown in FIG. 21 whereby clockwise rotation of the lower planetary element PL of FIG. 22 will drive annular rotary element rotary element R clockwise. In this manner, this planetary rotary element PL (and likewise the other two planetary rotary elements) is bidirectionally coupled to annular rotary element R by the two axially spaced oppositely inclined engaging surfaces of its helical projections 40 continuously engaging projections 12 and 13 respectively.

To sum up, sun rotary element S is bidirectionally coupled to annular rotary element R via the set of three planetary rotary elements PL which are mounted on fixed carrier 20A, 20B.

Referring to FIGS. 21 and 22, the angle Ø in the radial plane defined by the engaging helical peripheral surfaces of the sun and planetary rotary elements and the planetary and annular rotary elements implies that any torque transmitted between these rotary elements will generate radially outward forces. In principle, it is undesirable that such forces should be borne by the bearings of the planetary rotary elements PL.

In order to alleviate this potential problem, the carrier 20A, 20B of FIG. 22 is preferably made resilient (e.g. by choice of the material of the carrier, or by employing cushioning elements between the carrier and the bearings) to allow limited radial outward movement of the bearings B of the shafts 3 of the planetary radial elements PL, such that the planetary radial elements PL bear against the projections 12 and 13 and thereby transfer the radial load to the annular rotary element R. Annular rotary element R may be made more substantial than e.g. a ring gear of a typical conventional planetary gear in order to bear this radial load.

Referring further to FIG. 22, it will be seen that annular rotary element R is mounted on bearings B and can be coupled in conventional fashion to external machinery (not shown). Shaft 3 of sun rotary element S is likewise mounted on bearings B and can be coupled in conventional fashion to e.g. a prime mover (not shown).

The tracks 12 and 13 of annular rotary element R are also shown in FIG. 22, and it will be apparent that the left hand helical projections 40 of each planetary rotary element PL run continuously on track 12 and the right hand helical projections 40 of each planetary rotary element PL run continuously on track 13. To this end, each of tracks 12 and 13 forms at least one complete (i.e. 360 degrees) turn.

In a variant, tracks 12 and 13 could be recessed rather than projecting, provided that the recess was sufficiently wide to accommodate the pitch of helical projections 40 of the planetary rotary elements. However such a variant is not preferred.

Optionally, in view of the virtual absence of sliding friction, the helical peripheral surfaces 5 and/or tracks 12 and 13 may be unlubricated.

FIGS. 23 and 24 show a differential arrangement of four frusto-conical rotary elements in accordance with the invention. The rotary elements comprise two identical rotary elements 1C having outer right-handed helical projections 40A and inner right-handed helical projections 40B, mounted for independent rotation about a common axis X1, and two identical rotary elements 2C having outer left-handed helical projections 40A and inner left-handed helical projections 40B mounted for independent rotation about axis X2, which intersects axis X1. The helical projections 40A and 40B are each of one complete turn and the helical projections 40B of both rotary elements 1C both engage the helical projections of both rotary elements 2C.

It will be apparent that the envelopes of the four frusto-conical rotary elements are each tapered inwardly in the axial direction i.e. towards the intersection of axes X1 and X2.

As best seen in FIG. 24, which shows diagrammatically the axial profiles of the helical projections 40A and 40B greatly exaggerated in size, in a manner similar to FIG. 8, the inclinations of the axial profiles of the peripheral surfaces 5 of helical projections 40A are opposite to, and complementary with, the inclinations of the peripheral surfaces 5 of helical projections 40B. Specifically, the leading edge of peripheral surface 5 of each helical projection 40A is of smaller diameter than its trailing edge whereas the leading edge of peripheral surface 5 of each helical projection 40B is of smaller diameter than its trailing edge, as best seen in FIG. 23.

By analogy with the explanation given with regard to the cylindrical embodiment of FIGS. 15, 16 and 17, the radial inclinations of the respective peripheral surfaces 5 of mutually engaging helical projections 40A are also complementary, as are the radial inclinations of mutually engaging helical projections 40B. Thus the mutual engagement between helical projections 40A couples rotary elements 1C and 2C in one direction of rotation, and the mutual engagement between helical projections 40B couples rotary elements 1C and 2C in the opposite direction of rotation. In this manner each frusto-conical rotary element 1C is bidirectionally rotationally coupled to both frusto-conical elements 2C.

This is illustrated in FIG. 24, which shows the contact points P of the mutually engaging rotary projections 40A and 40B. Contact points P lie in the common plane of axes X1 and X2.

Referring to FIG. 24 in more detail, the portion of helical projection 40A at the top right of rotary element 1C lies behind the contact point P shown at the top right, which in turn lies behind the corresponding portion of helical projection 40A shown at the right side of upper rotary element 2C. Accordingly, rotation of right hand rotary element 2C in the anticlockwise direction, viewed from right to left, will rotate upper rotary element 2C clockwise, viewed from top to bottom.

Conversely, rotation of right hand rotary element 2C in the clockwise direction will push down the right hand portion of helical projection 40B of the upper rotary element and will thereby rotate upper rotary element 2C anticlockwise.

In this manner, all four frusto-conical rotary elements 1C and 2C are bidirectionally coupled in a manner functionally equivalent to the coupling of bevelled gears in a conventional differential.

FIG. 25 shows a differential rotary drive arrangement in which an assembly of frusto-conical (i.e. bevelled) rotary elements 1C and 2C as shown in FIGS. 23 and 24 is substituted for conventional bevel gears. The differential is otherwise conventional. Thus a cage CG is mounted on bearings B for rotation about axis X2, and is driven by a transmission (not shown) from e.g. the engine of a vehicle. Cage CG carries facing rotary elements 1C and 2D which are mounted on shafts 3 for free rotation about axis X1. In use, axis X1 rotates with cage CG about axis X2.

Output shafts 3, secured to respective rotary elements 2C extend through apertures in the sides of cage CG and may be coupled to e.g. the road wheels (not shown) of a vehicle.

In a variant, one of the rotary elements 1C can be omitted.

I claim:

1. A rotary element for a rotary transmission, the rotary element having at least one helical radial projection disposed about a rotary axis thereof, the helical radial projection having a helical peripheral surface which defines an envelope of the rotary element, the helical peripheral surface having a profile in a radial plane which is inclined to a tangent to said envelope, whereby in use with another such rotary element having a helical radial projection of opposite handedness in the rotary transmission, a region of rolling contact of the helical peripheral surface with a helical peripheral surface of the other such rotary element helically traverses the helical peripheral surfaces to positively transmit rotary drive between the rotary elements.

2. The rotary element according to claim 1, which comprises at least two said helical radial projections disposed coaxially about the rotary axis thereof, the said at least two helical radial projections being axially spaced apart and having respective first and second helical peripheral surfaces which define the envelope of the rotary element, each helical peripheral surface having a respective profile in a respective radial plane which is inclined to a tangent to said envelope and inclinations of the first and second helical peripheral surfaces to the respective tangents being of opposite sense, whereby in use with the another such rotary element in the rotary transmission, the helical peripheral surfaces of the rotary element engage with the helical peripheral surfaces of complementary inclination of the other rotary element to positively transmit bidirectional rotary drive between the rotary elements at the regions of rolling contact.

3. The rotary element according to claim 1, wherein said helical peripheral surface has a convex profile in said radial plane.

4. The rotary element according to claim 3, wherein said convex profile is elliptical.

5. The rotary element according to claim 1, having wherein each rotary element has a plurality of said helical radial projections.

6. The rotary element according to claim 1, wherein the at least one helical radial projection has a transverse cross-section comprising two flank sides on either side of said helical peripheral surface.

7. The rotary element according to claim 6, wherein said helical peripheral surface is selectively treated by a treatment selected from the group consisting of hardening and polishing to reduce rolling friction.

8. A rotary drive arrangement comprising first and second mutually engaged rotary elements mounted for rotation about respective rotary axes thereof and having helical radial projections disposed about the respective rotary axes of the rotary elements, the helical radial projections being of opposite handedness, the helical radial projection of each rotary element having a helical peripheral surface which defines an envelope of that rotary element, the helical peripheral surface having a profile in a radial plane which is inclined to a tangent to said envelope, wherein in use a region of rolling contact of the respective helical peripheral surfaces helically traverses the helical peripheral surfaces to positively transmit rotary drive between the rotary elements.

9. The rotary drive arrangement according to claim 8, wherein said first and second mutually engaged rotary elements each have at least two said helical radial projections disposed coaxially about said respective rotary axes thereof, said helical radial projections being axially spaced apart, said profile of a first of said at least two helical radial projections having a first inclination with respect to said tangent and said profile of a second of said at least two helical radial projections having a second inclination with respect to said tangent, said second inclination being opposite to said first inclination, wherein said helical peripheral surface of said first helical radial projection of said first rotary element engages with said helical peripheral surface of said first helical radial projection of said second rotary element and said helical peripheral surface of said second helical radial projection of said first rotary element engages with said helical peripheral surface of said second helical radial projection of said second rotary element to positively transmit bidirectional rotary drive between the first and second rotary elements at the regions of rolling contact.

10. The rotary drive arrangement according to claim 9, wherein said regions of rolling contact remain in a common plane of said rotary axes.

11. The rotary drive arrangement according to claim 9, wherein the rotary elements are bevel in form and the rotary drive arrangement is selected from the group consisting of a differential and a planetary drive arrangement.

12. The rotary drive arrangement according to claim 8, wherein each of said helical peripheral surfaces has a convex profile in said radial plane.

13. The rotary drive arrangement according to claim 12, wherein said convex profile is elliptical.

14. The rotary drive arrangement according to claim 13, wherein relative axial positions of the rotary elements are variable so as to vary a drive ratio.

15. The rotary drive arrangement according to claim 8, wherein said region of rolling contact remains in a common plane of said rotary axes.

16. The rotary drive arrangement according to claim 8, wherein the respective helical peripheral surfaces of the helical radial projections have elliptical profiles defined by ellipses centred on the respective rotary axes of the rotary elements which ellipses touch at a point of rolling contact, the ellipses having a same major diameter and a same minor diameter and the respective rotary axes being spaced apart by half the sum of said major and minor diameters.

17. A rotary element for a rotary transmission, the rotary element having at least one helical radial projection disposed about a rotary axis thereof, the helical radial projection having a helical peripheral surface, the helical peripheral surface having a profile in a radial plane which is asymmetric, whereby in use with another such rotary element of opposite handedness in the rotary transmission, a region of rolling contact of the helical peripheral surface with a helical peripheral surface of the other such rotary element helically traverses the helical peripheral surfaces to positively transmit rotary drive between the rotary elements without interdigitation of their respective helical radial projections.

18. A rotary drive arrangement comprising first and second rotary elements mounted for rotation about respective rotary axes thereof and having helical radial projections disposed about the respective rotary axes of the rotary elements, the rotary elements being of opposite handedness, the helical projections having respective helical peripheral surfaces, each of which surfaces has a profile in a radial plane which is asymmetric, wherein in use a region of rolling contact of the respective helical peripheral surfaces helically traverses the helical peripheral surfaces to positively transmit rotary drive between the rotary elements without interdigitation of their respective helical radial projections.

* * * * *